(12) United States Patent
Okamoto et al.

(10) Patent No.: US 9,002,417 B2
(45) Date of Patent: Apr. 7, 2015

(54) ELECTRONIC DEVICE

(75) Inventors: Atsushi Okamoto, Osaka (JP); Nobuyuki Kitamura, Osaka (JP)

(73) Assignee: KYOCERA Corporation, Kyoto (JP)

( * ) Notice: Subject to any disclaimer, the term of this patent is extended or adjusted under 35 U.S.C. 154(b) by 292 days.

(21) Appl. No.: 13/635,320

(22) PCT Filed: Mar. 28, 2011

(86) PCT No.: PCT/JP2011/057664
§ 371 (c)(1),
(2), (4) Date: Sep. 14, 2012

(87) PCT Pub. No.: WO2011/122569
PCT Pub. Date: Oct. 6, 2011

(65) Prior Publication Data
US 2013/0005409 A1    Jan. 3, 2013

(30) Foreign Application Priority Data

Mar. 29, 2010  (JP) ................................ 2010-074314

(51) Int. Cl.
| | |
|---|---|
| H04M 1/00 | (2006.01) |
| H04W 88/02 | (2009.01) |
| H04M 1/02 | (2006.01) |
| H04M 1/18 | (2006.01) |

(52) U.S. Cl.
CPC ............ *H04M 1/0237* (2013.01); *H04M 1/18* (2013.01)

(58) Field of Classification Search
USPC ................ 455/550.1, 575.1, 575.8, 90.3, 95; 379/428.01, 433.01; 200/293; 368/88, 368/28
See application file for complete search history.

(56) References Cited

U.S. PATENT DOCUMENTS

2007/0195512 A1*  8/2007  Konno ........................ 361/771
2008/0081679 A1*  4/2008  Kawasaki et al. .......... 455/575.8

FOREIGN PATENT DOCUMENTS

| JP | 2007-227111 A | 9/2007 |
|---|---|---|
| JP | 2008-106932 A | 5/2008 |
| JP | 2009-267550 A | 12/2009 |
| JP | 2010-056810 A | 3/2010 |

OTHER PUBLICATIONS

International Search Report dated Apr. 26, 2011, issued for International Application No. PCT/JP2011/057664.

* cited by examiner

*Primary Examiner* — John J Lee
(74) *Attorney, Agent, or Firm* — Procopio, Cory, Hargreaves & Savitch LLP

(57) ABSTRACT

An electronic device that can suppress galvanic corrosion from occurring on a metal constituent member and a metal screw member is provided. The electronic device according to the present invention includes a first constituent member in which a first screw hole is provided, a second constituent member through which a second screw hole is provided at a position facing the first screw hole, and a screw member that penetrates through the second screw hole to the first screw hole. A first seal member that surrounds edges of the first screw hole and the second screw hole is arranged on the first constituent member and the second constituent member, a second seal member that covers the screw member and an edge thereof is arranged on the second constituent member, and a third constituent member that covers the second seal member is fitted on the second constituent member.

5 Claims, 9 Drawing Sheets

F I G. 4
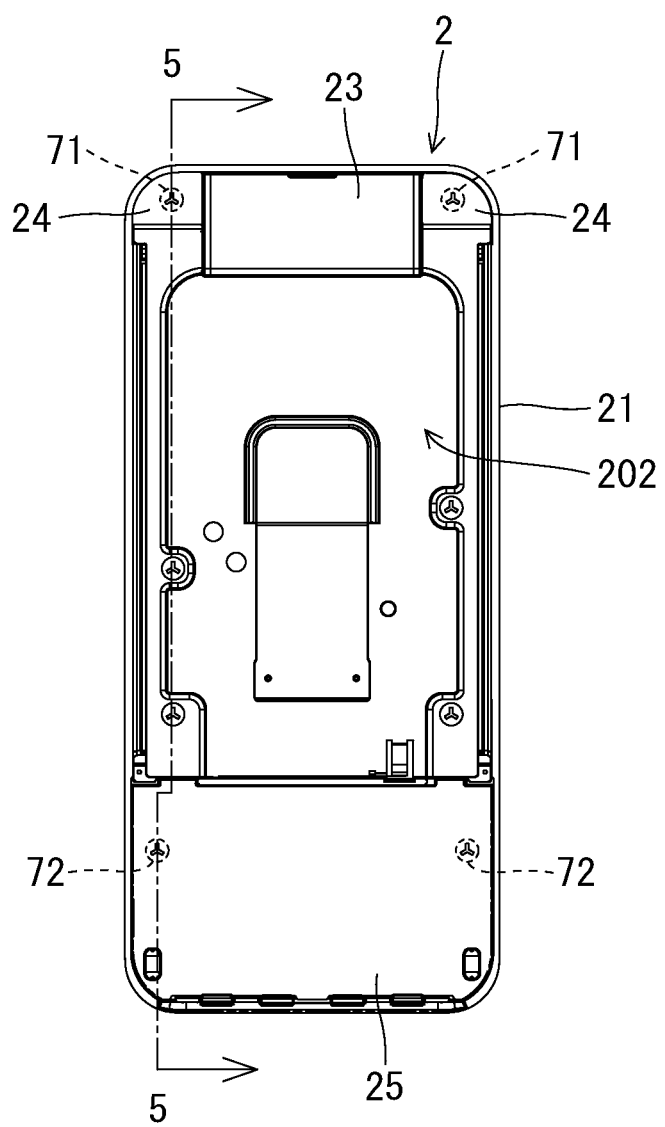

ELECTRONIC DEVICE

TECHNICAL FIELD

The present invention relates to an electronic device such as a mobile phone in which at least a part of a device main body is configured by fastening two constituent members to each other with a metal screw member.

BACKGROUND ART

In a mobile phone, a cabinet is fixed to a chassis to configure a device main body, and one or a plurality of constituent members configuring the cabinet are fastened to the chassis with a metal screw member (for example, see Patent Document 1).

In recent years, in order to reduce a mobile phone in size, it is conceived that a chassis is formed by using a magnesium alloy. According to the chassis made of a magnesium alloy, the chassis can be processed to have a complex shape and can be reduced in thickness. On the other hand, as a metal configuring the screw member, stainless steel (SUS) is conventionally used. According to the SUS screw member, the strength is increased.

PRIOR ART DOCUMENT

Patent Document

Patent Document 1: Japanese Patent Laid-open Publication No. 2010-56810

SUMMARY OF THE INVENTION

Problems to be Solved by the Invention

However, in the configuration of the mobile phone in which the SUS screw member is screwed through the cabinet into the chassis made of a magnesium alloy, the chassis and the screw member made of different metals are brought into contact with each other or proximate to each other. When the mobile phone having such a configuration is exposed to rainwater or the like to allow the ingress of water from the outside into the device main body, the water may penetrate between the chassis and the screw member, thereby causing galvanic corrosion on the chassis or the screw member.

The chassis is made of resin to make it possible to suppress galvanic corrosion on the chassis and the screw member. However, in the configuration, in order to increase the strength of the device main body, the thickness of the chassis must be increased.

Furthermore, when both the chassis and the screw member are made of SUS or a magnesium alloy to make the metals configuring the chassis and the screw member the same as each other, galvanic corrosion on the chassis and the screw member can be suppressed. However, when the chassis is made of SUS, the chassis is difficult to be processed in a complex shape. Furthermore, when the screw member is made of a magnesium alloy, the strength of the screw member may be lowered.

It is an object of the present invention to provide an electronic device that can suppress galvanic corrosion from occurring on a metal constituent member and a metal screw member.

Means for Solving the Problems

According to the present invention, there is provided an electronic device including:

a first constituent member in which a first screw hole is provided;

a second constituent member through which a second screw hole is provided at a position facing the first screw hole; and a screw member that penetrates through the second screw hole to the first screw hole to fasten the first constituent member to the second constituent member, wherein the first constituent member and the second constituent member are made of a metal different from that of the screw member, a first seal member that surrounds edges of the first screw hole and the second screw hole is arranged on the first constituent member and the second constituent member, after the first constituent member is fastened to the second constituent member with the screw member, a second seal member that covers the screw member and an edge thereof is arranged on the second constituent member, and a third constituent member that covers the second seal member is fitted on the second constituent member.

In the electronic device, the first screw hole formed in the first constituent member and the second screw hole formed through the second constituent member form a housing room in which the screw member is housed. The first seal member is interposed between the first constituent member and the second constituent member to surround the first screw hole and the second screw hole, and the screw member and an edge thereof are covered with the second seal member between the second constituent member and the third constituent member.

Thus, the ingress of water through a portion between the first constituent member and the second constituent member into the housing room is suppressed by the first seal member, and the ingress of water through a portion between the second constituent member and the third constituent member into the housing is suppressed. As a result, the housing room can be maintained in an air-tight state with the first seal member and the second seal member. More specifically, the electronic device has a waterproof structure that can suppress the ingress of water into the housing room.

Thus, according to the electronic device, even when the electronic device is exposed to rainwater or the like, the ingress of water between the first constituent member and/or the second constituent member and the screw member can be suppressed. For this reason, even when the first constituent member and/or the second constituent member are made of a metal different from a metal configuring the screw member, it is possible to suppress galvanic corrosion from occurring on the first constituent member, the second constituent member, and the screw member.

Effects of the Invention

According to the electronic device of the present invention, it is possible to suppress galvanic corrosion from occurring on a metal constituent member and a metal screw member.

BRIEF DESCRIPTION OF THE DRAWINGS

FIG. 4 is a back view of a second cabinet configuring the device main body.

DETAILED DESCRIPTION OF EMBODIMENTS

An embodiment in which the present invention is applied to a sliding-type mobile phone will be concretely described below with reference to the accompanying drawings.

Figure 1:
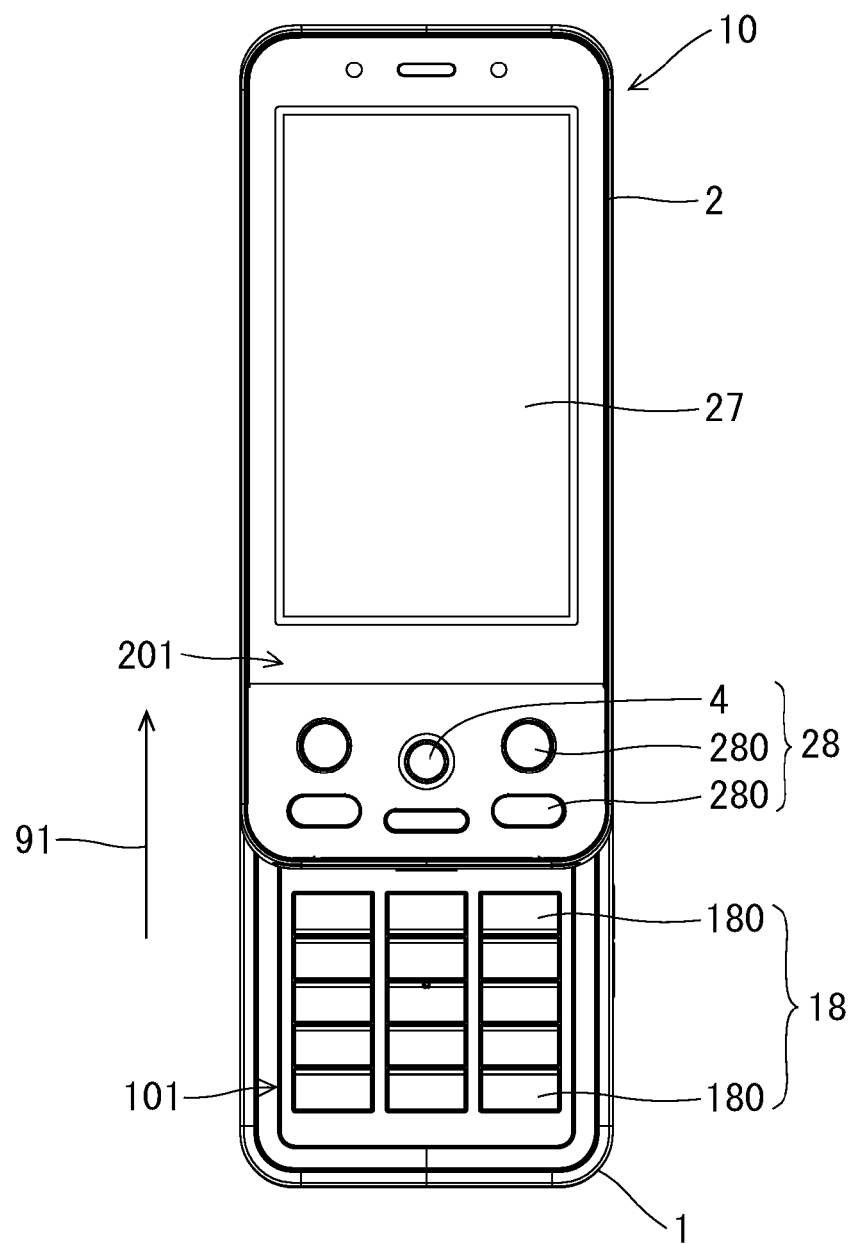
FIG. 1 is a front view showing a sliding-type mobile phone according to an embodiment of the present invention.

FIG. 1 is a front view showing a sliding-type mobile phone according to an embodiment of the present invention. As shown in FIG. 1, the sliding-type mobile phone includes a device main body 10 configured by slidably connecting a first cabinet 1 to a second cabinet 2. On a front surface 101 of the first cabinet 1, a first operation portion 18 configured by a plurality of operation keys 180 to 180 is installed.

On a front surface 201 of the second cabinet 2, a display portion configured by a liquid crystal display panel 27 is installed. In the second cabinet 2, a second operation portion 28 configured by a lever switch 4 and a plurality of operation keys 280 to 280 is installed. On a front surface 201 of the second cabinet 2, in a region different from an installation region of the liquid crystal display panel 27, a part of the second operation portion 28, i.e., an operator (first key top 43 (described later)) of the lever switch 4 and operators (second key tops 282 (described later)) of operation keys 280 are exposed.

Figure 2:
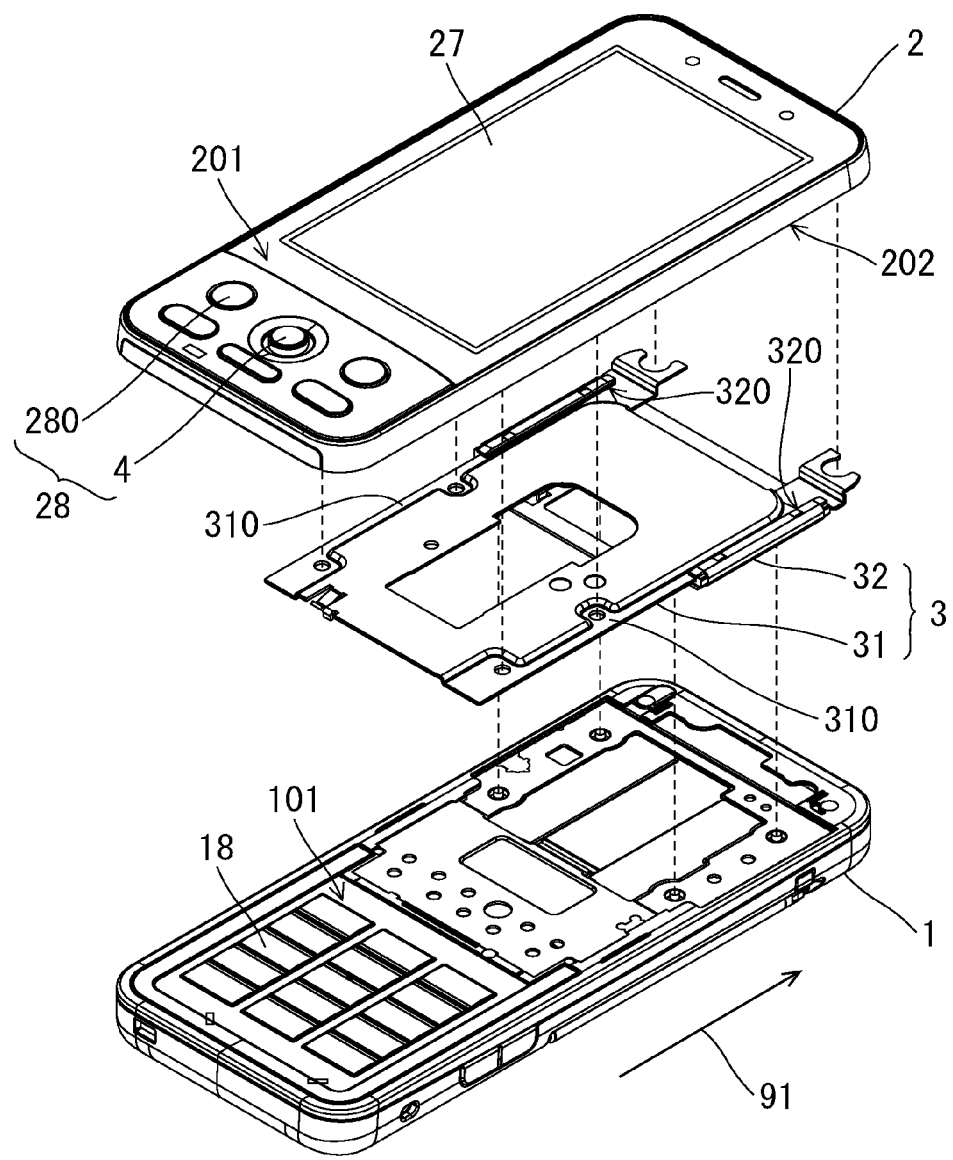
FIG. 2 is an exploded perspective view of the sliding-type mobile phone.

FIG. 2 is an exploded perspective view of the sliding-type mobile phone. As shown in FIG. 2, a sliding mechanism 3 that slidably connects the first cabinet 1 and the second cabinet 2 to each other is arranged therebetween, and the sliding mechanism 3 is configured by a slide body 31 and a slide regulating portion 32. The slide body 31 is fixed to one counter-facing surface (i.e., a rear surface 202 of the second cabinet 2) at the side of the second cabinet 2 out of counter-facing surfaces between the first cabinet 1 and the second cabinet 2. On the other hand, the slide regulating portion 32 is fixed to another counter-facing surface (i.e., the front surface 101 of the first cabinet 1) at the side of the first cabinet 1 out of the counter-facing surfaces between the first cabinet 1 and the second cabinet 2, more specifically, fixed to a region different from the installation region of the first operation portion 18.

Further, on both the end positions of the slide regulating portion 32 are formed one pair of left and right guide hooks 320, 320, with which left and right edge portions 310, 310 of the slide body 31 are slidably engaged. In this manner, the slide regulating portion 32 regulates the sliding direction of the slide body 31 to a longitudinal direction 91 of the first cabinet 1.

Figure 3:
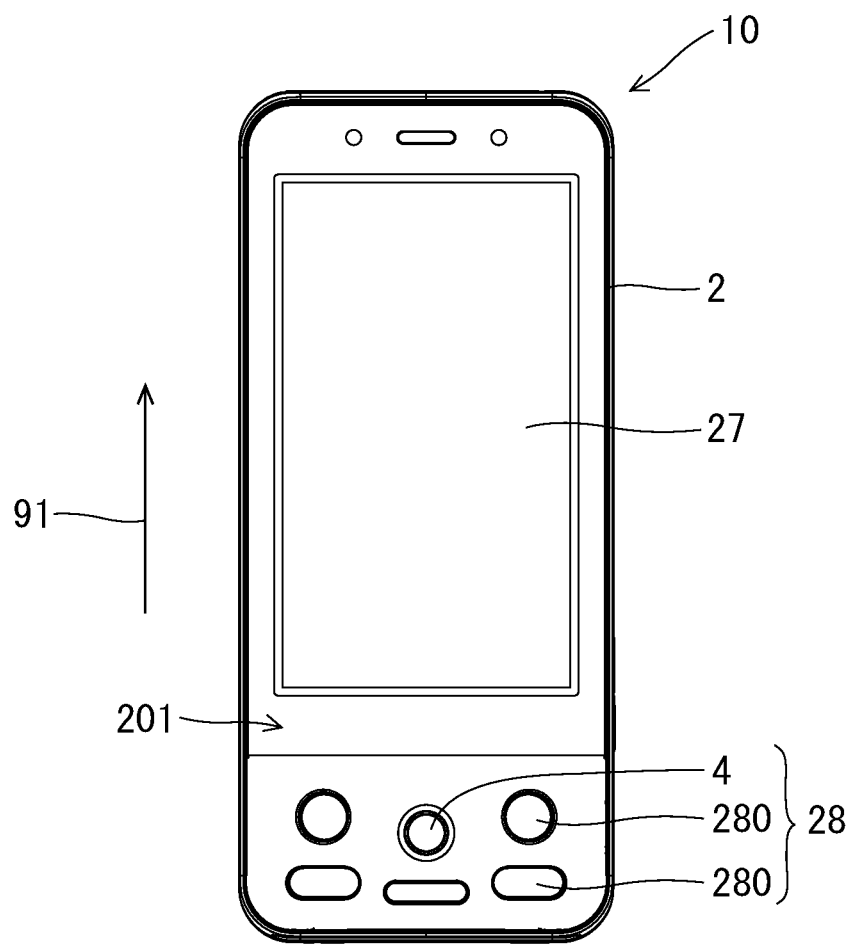
FIG. 3 is a front view used in a description of a closed state of a device main body of the sliding-type mobile phone.

For this reason, the device main body 10 of the sliding-type mobile phone relatively moves the first cabinet 1 and second cabinet 2 in the sliding direction to make it possible to change a state between a closed state in which both the cabinets 1, 2 are closed as shown in FIG. 3 such that the entire area of the first operation portion 18 is covered with the second cabinet 2 and an open state in which both the cabinets 1, 2 are opened as shown in FIG. 1 such that the entire area of the first operation portion 18 is exposed.

A user of the sliding-type mobile phone can operate the sliding-type mobile phone by using the first operation portion 18 and the second operation portion 28 when the device main body 10 is set to the open state as shown in FIG. 1. As shown in FIG. 3, even when the device main body 10 is set to the closed state, the user can operate the sliding-type mobile phone by using the second operation portion 28.

Figure 5:
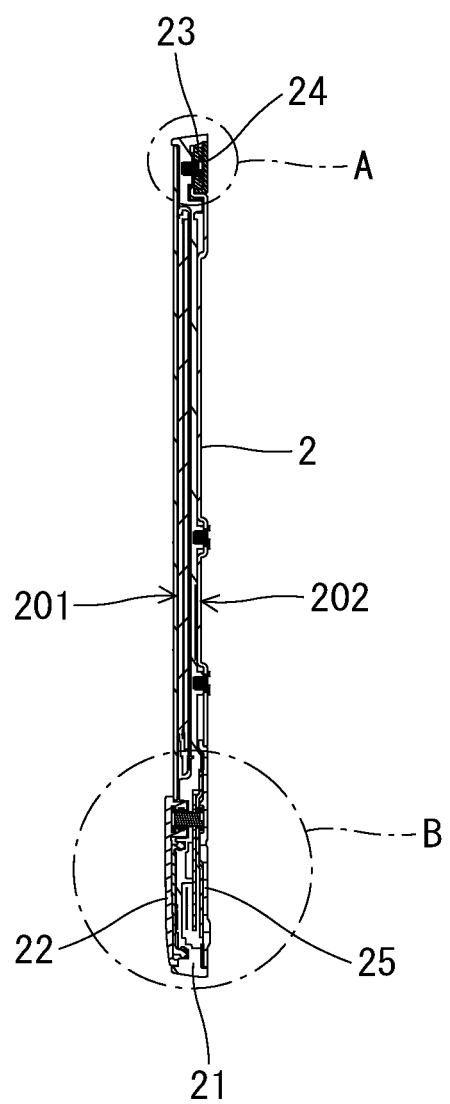
FIG. 5 is a sectional view along a 5-5 line shown in FIG. 4.
Figure 6:
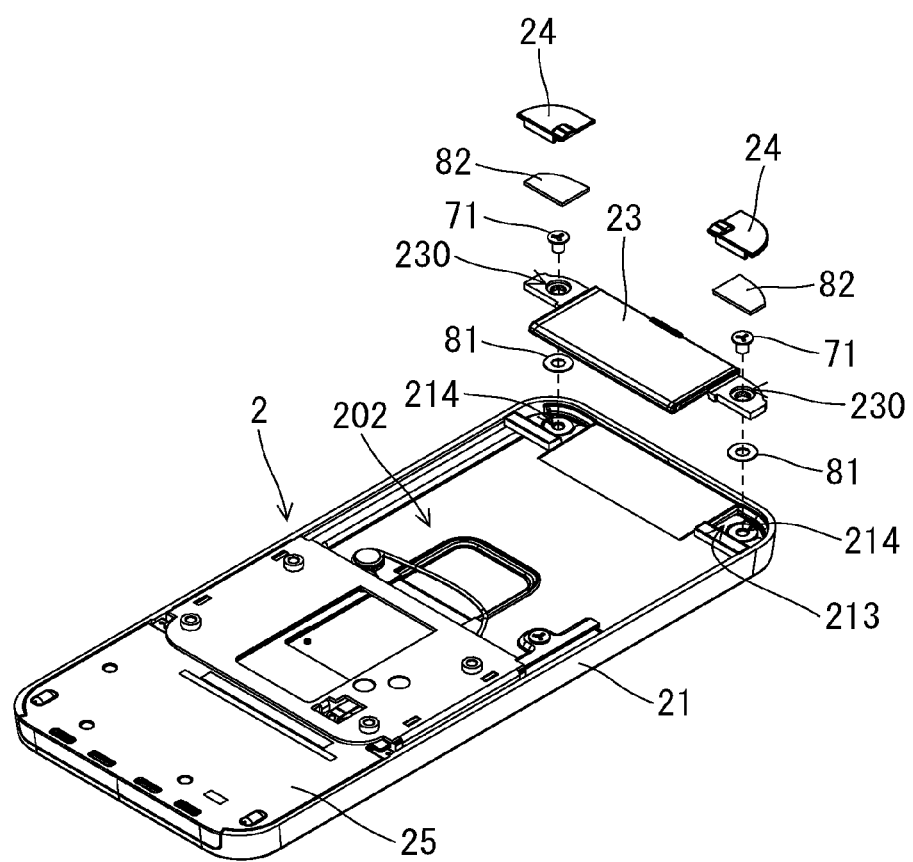
FIG. 6 is an exploded perspective view showing a part of the second cabinet corresponding to an A region shown in FIG. 5.

FIG. 4 is a back view of the second cabinet 2. FIG. 5 is a sectional view along a 5-5 line shown in FIG. 4. FIG. 6 is an exploded perspective view showing a part of the second cabinet 2 corresponding to an A region shown in FIG. 5. As shown in FIGS. 4 and 6, the second cabinet 2 has, as constituent members configuring an upper portion thereof, a chassis 21 (corresponding to a first constituent member) made of a magnesium alloy and a design panel 23 (corresponding to a third constituent member) that is engaged to a rear surface of the chassis 21 to form a part of a rear surface 202 of the second cabinet 2 (corresponding to a second constituent member).

Figure 7:
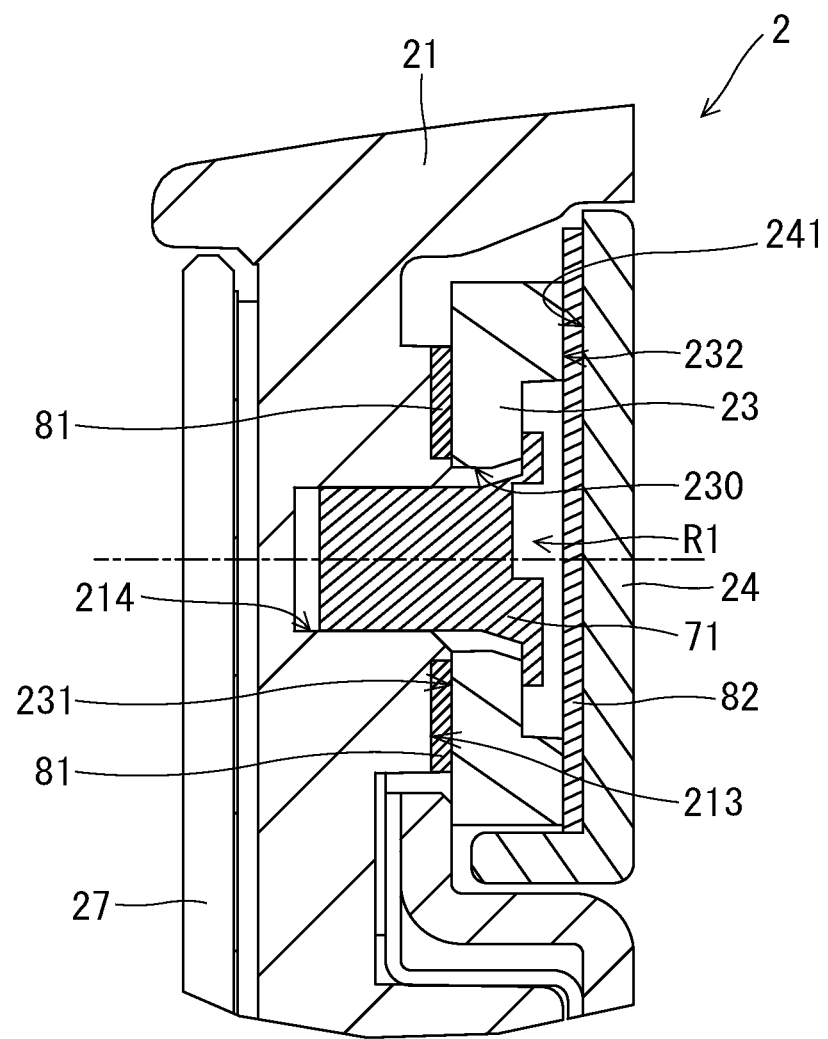
FIG. 7 is an enlarged view of the A region shown in FIG. 5.

FIG. 7 is an enlarged view of the A region shown in FIG. 5. As shown in FIG. 7 (also see FIG. 6), into an engaging surface 213 at the side of the chassis 21 out of engaging surfaces 213, 231 of the chassis 21 and the design panel 23, a first screw member 71 made of stainless steel (SUS) is screwed through the design panel 23, so that the design panel 23 is fastened to the chassis 21. In the embodiment, as shown in FIG. 6, two first screw members 71, 71 are screwed in two positions of the engaging surface 213 of the chassis 21 to fasten the design panel 23 to the chassis 21.

More specifically, in the engaging surface 213 of the chassis 21, a screw hole 214 (corresponding to a first screw hole) into which the first screw member 71 is screwed is formed to have a bottomed concave shape, and through the design panel 23, a through hole 230 (corresponding to a second screw hole) through which the first screw member 71 penetrates is formed. A ring-like waterproof tape 81 (corresponding to a first seal member) that extends to surround the screw hole 214 of the chassis 21 is interposed between the engaging surfaces 213, 231 of the chassis 21 and the design panel 23. In this case, the waterproof tape 81 is a double-faced adhesive tape having a waterproof property and is used as a seal member that seals a portion between the engaging surfaces 213 and 231 of the chassis 21 and the design panel 23.

As shown in FIG. 7 (also see FIG. 6), a cover panel 24 that covers the through hole 230 of the design panel 23 is engaged to a rear surface of the design panel 23. A sheet-like waterproof tape 82 is interposed between engaging surfaces 232, 241 of the design panel 23 and the cover panel 24, and the waterproof tape 82 surrounds the through hole 230 of the design panel 23 and covers the through hole 230. In this case, the waterproof tape 82 (corresponding to a second seal member) is a double-faced adhesive tape having a waterproof property and is used as a seal member that seals a portion between the engaging surfaces 232, 241 of the design panel 23 and the cover panel 24.

In the sliding-type mobile phone, as shown in FIG. 7, in the second cabinet 2, a first housing room R1 in which the first screw member 71 is housed is formed by the bottomed cylindrical screw hole 214 formed in the engaging surface 213 of the chassis 21 and the through hole 230 formed through the design panel 23. In this case, the ring-like waterproof tape 81 is interposed between the engaging surfaces 213, 231 of the chassis 21 and the design panel 23, and the sheet-like waterproof tape 82 is interposed between the engaging surfaces 232, 241 of the design panel 23 and the cover panel 24. Thus, the ingress of water through a portion between the engaging surfaces 213, 231 of the chassis 21 and the design panel 23 into the first housing room R1 is suppressed by the ring-like waterproof tape 81, and the ingress of water through a portion between the engaging surfaces 232, 241 of the design panel 23 and the cover panel 24 into the first housing room R1 is suppressed by the sheet-like waterproof tape 82. As a result, the first housing room R1 is air-tightly closed by the two waterproof tapes 81, 82. That is, the sliding-type mobile phone has a waterproof structure that suppresses the ingress of water into the first housing room R1.

Thus, according to the sliding-type mobile phone, even when the sliding-type mobile phone is exposed to rainwater or the like, the ingress of water between the chassis 21 and the first screw member 71 can be suppressed. For this reason, although the chassis 21 is made of a metal (a magnesium alloy in the embodiment) different from a metal (SUS in the embodiment) configuring the first screw member 71, it is possible to suppress galvanic corrosion from occurring on the chassis 21 and the first screw member 71.

Figure 8:
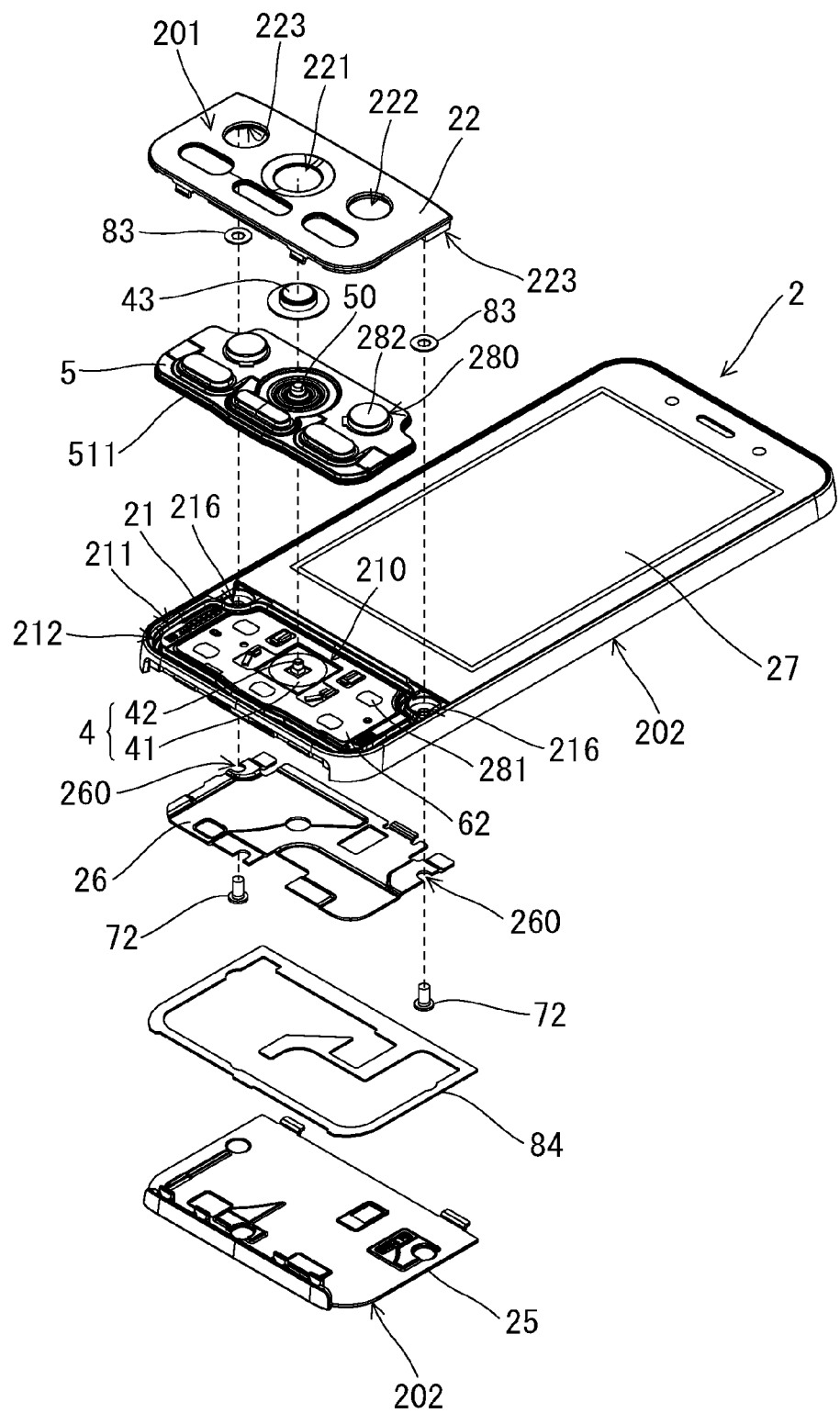
FIG. 8 is an exploded perspective view showing a part of the second cabinet corresponding to a B region shown in FIG. 5.

FIG. 8 is an exploded perspective view showing a part of the second cabinet 2 corresponding to a B region shown in FIG. 5. As shown in FIG. 8, the lever switch 4 includes a rectangular switch main body 41 and a lever portion 42 projecting from the switch main body 41. The lever switch 4 according to the embodiment can perform a lever operation such that the lever portion 42 is slid in a total of eight directions including four vertical and horizontal directions and their four oblique directions with reference to the switch main body 41, and a lever operation such that the lever portion 42 is depressed toward the switch main body 41. Although not shown, the lever switch 4 is mounted on a first substrate arranged in the second cabinet 2.

The second cabinet 2 has, as a constituent member configuring a lower portion thereof, the chassis 21 made of a magnesium alloy and a cover member 22 that is engaged to the chassis 21 to form a part of the front surface 201 of the second cabinet 2. In a region of the chassis 21 covered with the cover member 22, a square opening 210 that houses the switch main body 41 of the lever switch 4 is formed.

The first substrate is arranged at a rear surface side of the chassis 21, and the switch main body 41 of the lever switch 4 mounted on the first substrate, as shown in FIG. 8, is inserted from the rear surface side of the chassis 21 into the opening 210 of the chassis 21. The switch main body 41 is fixedly held by the opening 210 of the chassis 21.

As shown in FIG. 8, in a region of the chassis 21 covered with the cover member 22, a sheet-like second substrate 62 that spreads to surround the opening 210 of the chassis 21 is arranged. On a front surface of the second substrate 62, a dome switch 281 configuring the operation keys 280 is mounted.

Furthermore, in the region of the chassis 21 covered with the cover member 22, an engaging surface 211 that spreads to surround the installation region of the second substrate 62 is formed, to which the cover member 22 should be engaged. On the engaging surface 211, an annular groove 212 extending to surround the installation region of the second substrate 62 is concavely formed.

Figure 9:
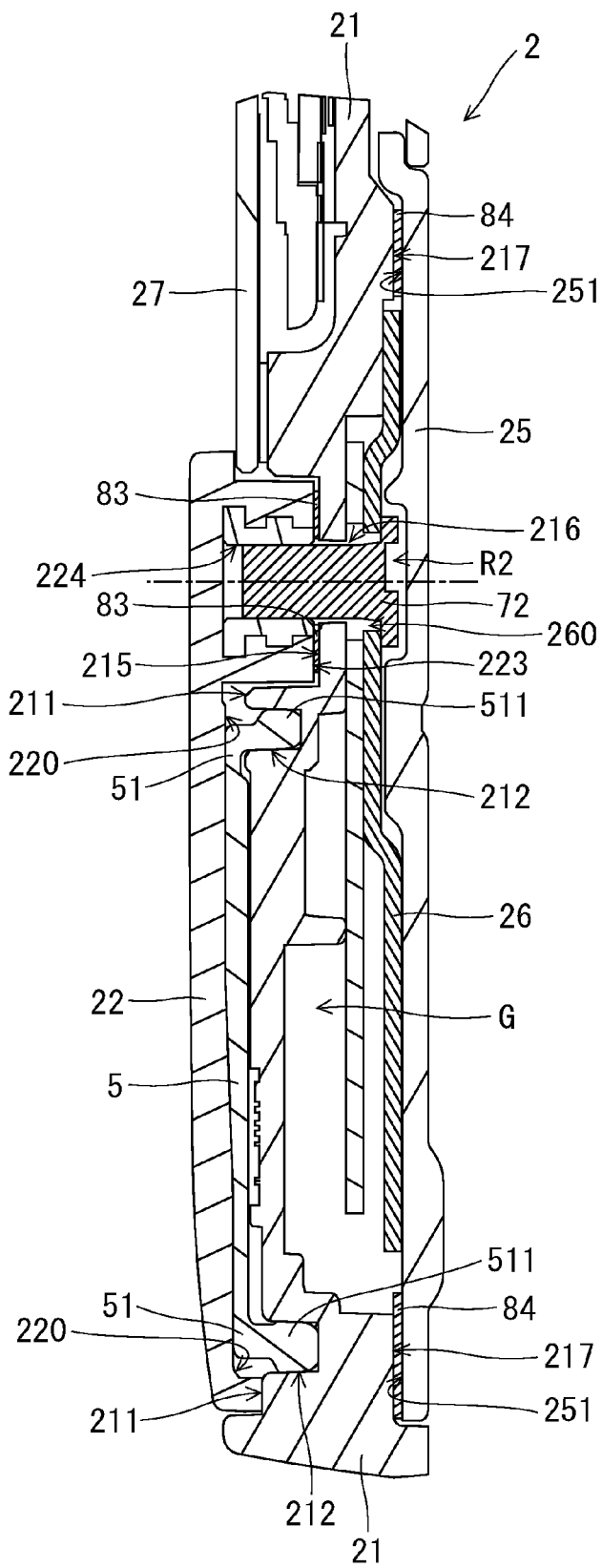
FIG. 9 is an enlarged view of the B region shown in FIG. 5.

FIG. 9 is an enlarged view of the B region shown in FIG. 5. As shown in FIG. 9 (also see FIG. 8), at a rear surface side of the cover member 22, a waterproof rubber 5 that covers the opening 210 of the chassis 21 and the second substrate 62 is arranged. The waterproof rubber 5 has a shape extending to a position overlapping with the engaging surface 211 of the chassis 21. From an outer edge portion 51 of the waterproof rubber 5, a seal portion 511 that should be fitted into the annular groove 212 of the chassis 21 is formed to project toward the annular groove 212.

Thus, as shown in FIG. 9, in an assembling state of the second cabinet 2, the seal portion 511 of the waterproof rubber 5 is fitted into the annular groove 212 of the chassis 21, and the cover member 22 is engaged to the chassis 21. In this manner, the seal portion 511 is depressed into the annular groove 212 by an engaging surface 220 of the cover member 22. For this reason, the seal portion 511 of the waterproof rubber 5 is fitted into the annular groove 212 without any gap. At this time, the outer edge portion 51 of the waterproof rubber 5 is interposed between the engaging surfaces 211, 220 of the chassis 21 and the cover member 22.

As shown in FIG. 8, on the waterproof rubber 5, a bottomed cylindrical portion 50 is further formed into which a distal end portion of the lever portion 42 of the lever switch 4 is inserted. In this case, the bottomed cylindrical portion 50 opens in a rear surface of the waterproof rubber 5 and projects from a front surface of the waterproof rubber 5. Thus, an operating physical force can be applied from the front surface side of the waterproof rubber 5 to the bottomed cylindrical portion 50 in various directions. When the operating physical force is applied to the bottomed cylindrical portion 50, the lever portion 42 of the lever switch 4 is moved in an operating direction together with the bottomed cylindrical portion 50. Thus, the lever operation to the lever switch 4 can be suppressed from being hindered by the waterproof rubber 5.

Although not shown, on the rear surface of the waterproof rubber 5, a projecting portion is formed in a region opposing each of the dome switches 281. The projecting portion is brought into contact with the dome switch 281 in the assembling state of the second cabinet 2. When a depression force is applied to a region of the front surface of the waterproof rubber 5 overlapping with each of the projecting portions at the rear surface side, the depression force is brought through the projecting portion to the dome switch 281 corresponding to each of the projecting portions. As a result, the dome switch 281 is depressed. Thus, the depression operation to the operation key 280 can be suppressed from being hindered by the waterproof rubber 5.

As shown in FIG. 8, on the bottomed cylindrical portion 50 of the waterproof rubber 5, the first key top 43 serving as an operator of the lever switch 4 is fitted. On the front surface of the waterproof rubber 5, the second key top 282 serving as an operator of the operation key 280 is stuck and fixed to a position overlapping with each of the dome switches 281.

In this case, through the cover member 22, a first window 221 that exposes the first key top 43 of the lever switch 4 on the front surface of the cover member 22 and a second window 222 that exposes the second key top 282 of each of the operation keys 280 on the front surface of the cover member 22 are formed. Thus, a user of the sliding-type mobile phone can execute a lever operation to the lever switch 4 by applying an operating physical force to the first key top 43, and can execute a depression operation to the operation key 280 corresponding to the second key top 282 by applying an operating physical force to each of the second key tops 282.

As shown in FIG. 9 (also see FIG. 8), on counter-facing surfaces between the chassis 21 and the cover member 22, other engaging surfaces 215, 223 are formed, respectively, at the outside of a region in which the engaging surfaces 211, 220 are formed between which the outer edge portion 51 of the waterproof rubber 5 is to be interposed. A second screw member 72 made of SUS is screwed through the chassis 21 into the other engaging surface 223 of the cover member 22 to fasten the cover member 22 to the chassis 21. In the embodiment, as shown in FIG. 8, two second screw members 72, 72 are screwed in two positions of the other engaging surface 223 of the cover member 22 to fasten the cover member 22 to the chassis 21.

More specifically, in the other engaging surface 223 of the cover member 22, a screw hole 224 having a bottomed concave shape is formed into which the second screw member 72 is screwed, and through the chassis 21, a through hole 216 is formed through which the second screw member 72 penetrates. A ring-like waterproof tape 83 that extends to surround the screw hole 224 of the cover member 22 is interposed between the other engaging surfaces 215, 223 of the chassis 21 and the cover member 22. In this case, the waterproof tape 83 is a double-faced adhesive tape having a waterproof property and is used as a seal member that seals a portion between the other engaging surfaces 215, 223 of the chassis 21 and the cover member 22.

As shown in FIG. 9 (also see FIG. 8), to the rear surface of the chassis 21, a rear-surface panel 25 that covers the through hole 216 of the chassis 21 is engaged. A frame-like waterproof tape 84 that extends to surround the through hole 216 of the chassis 21 is interposed between the engaging surfaces 217, 251 of the chassis 21 and the rear-surface panel 25. In this case, the waterproof tape 84 is a double-faced adhesive tape having a waterproof property and is used as a seal member that seals a portion between the engaging surfaces 217, 251 of the chassis 21 and the rear-surface panel 25.

In the embodiment, as shown in FIG. 8, a metal plate 26 is interposed between the chassis 21 and the rear-surface panel 25, and a cutout 260 through which the second screw member 72 penetrates is formed on an outer edge portion of the metal plate 26. As shown in FIG. 9, the second screw member 72 is screwed through the cutout 260 of the metal plate 26 and the through hole 216 of the chassis 21 into the screw hole 224 of the cover member 22, thereby also fastening the metal plate 26 to the chassis 21.

In the sliding-type mobile phone, even when water comes from the first and second windows 221, 222 of the cover member 22 into the rear surface side of the cover member 22, the water is suppressed from passing through the waterproof rubber 5. Thus, the water that has come thereinto accumulates on the front surface of the waterproof rubber 5 or moves along the front surface of the waterproof rubber 5. In this case, the outer edge portion 51 of the waterproof rubber 5 is interposed between the engaging surfaces 211, 220 of the chassis 21 and the cover member 22, and the seal portion 511 is fitted into the annular groove 212 without any gap. Thus, even when the water that has come thereinto moves on the front surface of the waterproof rubber 5 toward the engaging surfaces 211, 220, the water is suppressed from moving to the rear surface of the waterproof rubber 5 by the outer edge portion 51 and the seal portion 511 of the waterproof rubber 5.

In addition, the water is suppressed from coming from the outside of the device main body 10 through a portion between the engaging surfaces 211, 220 of the chassis 21 and the cover member 22 into the device main body 10 by the outer edge portion 51 of the waterproof rubber 5 interposed between the engaging surfaces 211, 220 and the seal portion 511 fitted into the annular groove 212 without any gap.

Furthermore, in the second cabinet 2 of the sliding-type mobile phone, as shown in FIG. 9, a second housing room R2 in which the second screw member 72 is housed is formed of a bottomed cylindrical screw hole 224 formed in the other engaging surface 223 of the cover member 22 and a through hole 216 formed through the chassis 21. In the embodiment, the second housing room R2 communicates with the opening 210 of the chassis 21 through a gap G formed between the chassis 21 and the rear-surface panel 25.

In this case, the ring-like waterproof tape 83 is interposed between the other engaging surfaces 215, 223 of the chassis 21 and the cover member 22, and the frame-like waterproof tape 84 is interposed between the engaging surfaces 217, 251 of the chassis 21 and the rear-surface panel 25. Thus, the ingress of water through a portion between the other engaging surfaces 215, 223 of the chassis 21 and the cover member 22 into the second housing room R2 is suppressed by the ring-like waterproof tape 83, and the ingress of water through a portion between engaging surfaces 217, 251 of the chassis 21 and the rear-surface panel 25 into the second housing room R2 is suppressed by the frame-like waterproof tape 84.

According to the sliding-type mobile phone, the second housing room R2, the gap G, the opening 210 of the chassis 21, and a region on the front surface of the second substrate 62 are air-tightly closed. That is, the sliding-type mobile phone has a waterproof structure that suppresses the ingress of water into the second housing room R2, the gap G, the opening 210 in which the lever switch 4 is housed and onto the region on the front surface of the second substrate 62.

Thus, even when the sliding-type mobile phone is exposed to rainwater or the like, the ingress of water from coming between the chassis 21 and the second screw member 72 can be suppressed. For this reason, although the chassis 21 is made of a metal (a magnesium alloy in the embodiment) different from a metal (SUS in the embodiment) configuring the second screw member 72, it is possible to suppress galvanic corrosion from occurring on the chassis 21 and the second screw member 72.

The configuration of the components in the present invention is not limited to the above embodiments, and various changes and modifications can be effected without departing from the spirit and scope of the invention. For example, the configurations employed in the sliding-type mobile phone can be applied to various mobile phones such as a foldable mobile phone and a straight type mobile phone. The configurations employed in the sliding-type mobile phone can be applied to not only a mobile phone but also various electronic devices such as a PDA (Personal Digital Assistant), a digital camera and a video camera.

Furthermore, the configuration of the sliding-type mobile phone described above is merely an example of the present invention. The present invention can be applied to various electronic devices in each of which a plurality of constituent members configuring the device main body 10 are made of various different metals.

DESCRIPTION OF REFERENCE CHARACTERS

10 Device main body
1 First cabinet
2 Second cabinet
201 Front surface
202 Rear surface
21 Chassis (first constituent member)
213 Engaging surface
214 Screw hole
215 Engaging surface
216 Through hole
217 Engaging surface
22 Cover member (constituent member)
223 Engaging surface
224 Screw hole
23 Design panel (second constituent member)
230 Through hole
231 Engaging surface
232 Engaging surface
24 Cover panel (third constituent member)
241 Engaging surface
25 Rear-surface panel (panel member)
251 Engaging surface
3 Sliding mechanism
4 Lever switch 5 Waterproof rubber
50 Bottomed cylindrical portion
71 First screw member
72 Second screw member
81 Waterproof tape (first seal member)
82 Waterproof tape (second seal member)
83 Waterproof tape (first seal member)
84 Waterproof tape (second seal member)
R1 First housing room
R2 Second housing room

The invention claimed is:

1. An electronic device comprising:
   a first constituent member in which a first screw hole is provided;
   a second constituent member through which a second screw hole is provided at a position facing the first screw hole;
   a third constituent member arranged over the second constituent member;
   a screw member that penetrates through the second screw hole to the first screw hole to fasten the first constituent member to the second constituent member, wherein the first constituent member and the second constituent member are made of a metal different from that of the screw member;
   a first waterproof seal member that surrounds edges of the first screw hole and the second screw hole, and is arranged between the first constituent member and the second constituent member; and
   a second waterproof seal member that is arranged between the second constituent member and the third constituent member to suppress the ingress of water to an end of the screw member that extends through the second screw hole of the second constituent member and faces the third constituent member.

2. The electronic device according to claim 1, wherein the first constituent member is a chassis, the second constituent member is a cabinet, and the third constituent member is a panel member that covers at least a part of the cabinet.

3. The electronic device according to claim 1, wherein the first waterproof seal member comprises a double-faced adhesive tape adhered to the first constituent member and the second constituent member.

4. The electronic device according to claim 1, wherein the second waterproof seal member comprises a double-faced adhesive tape adhered to the second constituent member and the third constituent member.

5. The electronic device according to claim 1, wherein a space is formed between the third constituent member and the end of the screw member facing the third constituent member, and wherein the second waterproof seal member is arranged to provide an air-tight seal surrounding the space.

* * * * *